United States Patent [19]

Gruenberger et al.

[11] 4,293,458

[45] Oct. 6, 1981

[54] THERMOPLASTIC POLYMER COMPOSITION MATERIALS FOR PRETREATING PAPER

[75] Inventors: Eberhard Gruenberger, Hilden; Roswitha Müller, Erkrath, both of Fed. Rep. of Germany

[73] Assignee: Henkel Kommanditgesellschaft auf Aktien, Düsseldorf-Holthausen, Fed. Rep. of Germany

[21] Appl. No.: 112,829

[22] Filed: Jan. 17, 1980

[30] Foreign Application Priority Data

Jan. 22, 1979 [DE] Fed. Rep. of Germany ....... 2902293

[51] Int. Cl.$^3$ ................................................ C08L 3/02
[52] U.S. Cl. ......................... 260/17.4 GC; 260/29.6 R; 260/29.6 MH; 260/29.6 MM; 428/512
[58] Field of Search .................. 260/17.4 GC, 29.6 R

[56] References Cited

U.S. PATENT DOCUMENTS

| | | | |
|---|---|---|---|
| 3,396,049 | 8/1968 | Anderson et al. | 428/512 |
| 3,847,856 | 11/1974 | Mueller et al. | 260/29.6 RB |
| 4,153,591 | 5/1979 | Yoshida et al. | 260/29.6 MM |

Primary Examiner—Edward M. Woodberry
Attorney, Agent, or Firm—Hammond & Littell, Weissenberger and Muserlian

[57] ABSTRACT

This invention is directed to a composition for pretreating the back of wallpaper, which comprises a mixture of:
  (a) a fine-grained dispersion of film-forming, non-blocking thermoplastic polymer;
  (b) a paraffin dispersion;
  (c) natural or synthetic zeolite;
  (d) optionally, additional conventional additives; and
  (e) water.

10 Claims, No Drawings

THERMOPLASTIC POLYMER COMPOSITION MATERIALS FOR PRETREATING PAPER

FIELD OF THE INVENTION

This invention is directed to material for pretreating paper. More particularly, this invention is directed to material for pretreating the backside of paper that is to be glued to a surface.

BACKGROUND OF THE INVENTION

The preparation of paper, such as wallpaper, or cardboard by application of layers of aqueous polymeric dispersions based upon copolymers of styrene with acrylic acid esters and/or butadiene or similar substances, or also in mixtures with emulsions of wax or paraffin, is known. Wallpaper backs pretreated in this manner can be coated with paste having a base of, for example, aqueous methyl cellulose solutions, and can be glued to a surface after a certain swelling time. It is also known to add waxes or pigments such as clay, chalk, or talc to the emulsions to be used for pretreatment. The incorporation of small quantities of water-soluble materials such as starch, dextrin, or similar substances is known as well.

However, these known pretreatment materials have various disadvantages. When a good separation effect is achieved, the side of the paper prepared in the respective manner described, i.e., laminated, has become so hydrophobic that its surface cannot be completely wetted with aqueous paste. The paste contracts on the hydrophobic layer and forms irregular islands. This undesirable phenomenon also can cause premature separation of the bonding. Furthermore, these pretreatment materials close off the surface of the paper so completely that the aqueous paste penetrates it only very slowly. The necessary so-caled swelling of the paper, or cardboard, to be glued on is consequently delayed so long that the paste begins to dry out, starting from the edges of the paper. As a result of this drying out, already applied widths of wallpaper may, for example, pull loose at the joining edges and the seams may buckle. The necessary regluing must be carried out with polymeric dispersions or emulsions and is expensive and especially time-consuming.

OBJECTS OF THE INVENTION

It is an object of the invention to provide materials for pretreating paper.

It is also an object of the invention to provide improved pretreated wallpapers.

It is further an object of the invention to alter known pretreatment materials in such a manner that, after application, they can be wetted more effectively and penetrated more quickly by the aqueous paste to permit perfect gluing, while retaining a separating effect.

These and other objects of the invention will become more apparent in the discussion below.

DESCRIPTION OF THE INVENTION

It has surprisingly been found that a certain pretreatment material can make the backsides of paper or cardboard, particularly of wallpaper, desirably strippable, i.e., capable of being removed. Wallpaper prepared with this material is wettable over the entire surface with an aqueous paste, swells quickly, and adheres well, and nevertheless is easy to peel off later. The pretreatment material applied to the paper or cardboard is an aqueous composition comprising a mixture of:
 (i) a dispersion of film-forming non-blocking thermoplastic polymer;
 (ii) a paraffin dispersion;
 (iii) natural or synthetic zeolite;
 (iv) optionally, additional conventional additivies; and
 (v) water.

Thermoplastic polymers, particularly copolymers of acrylic acid esters with styrene or copolymers which contain, in addition to the afore-mentioned monomer, vinyl chloride or a vinylester, such as vinyl acetate or the like, serve as the basic substance for the pretreatment materials for the backs of wallpapers. The film-forming temperature of suitable polymers should be above about 25° to 30° C. Furthermore, suitable polymers should not become tacky at or slightly above normal storage temperatures. The coating of wallpaper with such polymers is known, and an expert, i.e., an artisan skilled in the technology of the pretreatment of wallpaper, will find the selection of a suitable polymer in the form of its dispersion simple. Especially suitable are copolymers with styrene of the butyl ester of acylic acid, the ethyl ester of acrylic acid, the methy ester of acrylic acid, or the ethyl ester of methacrylic acid. Such polymers are commercially available as dispersions containing from about 30 to 60% by weight, preferably from about 40 to 55% by weight, of polymer and having a pH preferably between about 6 and 9. One such commercially available product is Acronal, which is available from BASF. Acronal is a dispersion of a copolymer of styrene and butyl acrylate having a particle size of about 0.2 to 0.3μ, a film-forming temperature of 42° C., and a viscosity of 250 mPa's according to Epprecht.

The useful paraffin dispersions are characterized in that they comprise from about 30 to 60%, preferably from 40 to 55% by weight, of paraffin and have a melting point of from about 35° to 50° C., preferably of from about 40° to 45° C. In the paraffin dispersions or emulsions, a soap of hydroxystearic acid or of oleic acid, or of other saturated fatty acids with 14 to 18 carbon atoms, is used. The cationic component for the soap is triethanolamine or diethanolamine. The content of such emulsifiers should be from about 5 to 15% by weight, based on the total weight of the paraffin dispersion. Various paraffin dispersions are commercially available, such as, for example, a 50% paraffin dispersion having the tradename Ravitol which is available from Henkel KGaA.

The natural and synthetic zeolites to be used according to the invention are also well-known compounds. These can be used, for example, as ion exchangers. Chemically, they are silicates, and particularly water-containing, alkali metal aluminosilicates or alkaline earth metal aluminosilicates. Since the naturally occurring zeolites frequently are not uniform, synthetically produced zeolites are preferably used to obtain readily reproducible results. The zeolites used should have a particle size of from about 2 to 30μ. Preferably the particle size is from about 3 to 10μ, most preferably from about 3 to 5μ.

The preparation of synthetic zeolites starts with silica containing and alumina containing substances that are reacted with alkali metal hydroxides such as sodium hydroxide to form the crystalline zeolites. Sodium aluminate solution and water glass, for example, can be reacted to prepare synthetic zeolites. Silicate of potassium as well as silicate of sodium, or their mixtures, can be used. The desired composition can be calculated simply. A suitable zeolite can be obtained from the mentioned components by heating and evaporation, or cooling, of the reaction mixture. An overview of the preparation and application of synthetic zeolites is found in the journal *Angewandte Chemie,* 87, (1975), pp. 659–667, incorporated herein by reference.

Preferably zeolite is present in an amount of from 1 to 25 percent by weight, more particularly from 2 to 20 percent by weight, based on the total solids content of the pre-treatment composition.

The total water content of the compositions of this invention should be from about 40 to 70 percent, preferably from about 50 to 65 percent, by weight, based on the total weight of the pretreatment composition.

The viscosity of the composition of the invention is from about 200 to 3,000 mPa's, preferably from about 200 to 1,500 mPa's.

According to an especially advantageous procedure, from about 0.05 to 0.5% by weight of partially saponified graft polymer of acrylonitrile on starch, based on the total weight of solid components, is added to the pretreatment material. The saponification is carried out only so far as amide groups are still present. Graft polymers for which from about 1 to 3 parts by weight acrylonitrile were polymerized onto 1 part starch are advantageously used. During the subsequent saponification, all nitrile groups should be saponified; however, based on the previously present nitrile content, from about 10 to 30% amide groups should still be present.

In addition to the above-mentioned components, additional hydrophobic substances may be included in the coating dispersions in smaller quantities. Suitable such substances include, for example, dispersions of low-molecular polyethylene or copolymers of ethylene with smaller amounts of comonomers such as propylene or vinyl acetate. However, the amount of these polymers should not exceed about 25 parts by weight, based on the solids content of the total laminating material. The addition in lesser amounts of other adjuvants which have a favorable influence on the stability of the dispersion, is possible. Suitable as such substances are anionactive or nonion-surface-active compounds or even certain thixotropic substances, such as bentonite, colloidal silicic acid, or similar compounds. These additives can be present in an amount of from about 0.1 to 5% by weight, based on the total solids content of the pretreatment material.

The aqueous pretreatment materials are applied to the paper substrate, e.g., wallpaper, by means of an air brush, size press, or wiping device. The amount of applied solid shall be from about 2 to 20 g/m$^2$, preferably from about 4 to 16 g/m$^2$, based on the lateral surface of the paper. The paper is dried in the regular manner, such as by either heat or air drying, after the application.

Wetting by aqueous paste over the entire surface of the applied layer is essential for the suitability of wallpaper since uniform bonding is achieved. Qualitatively, uniform wetting can be determined visually by applying a colored or tinted paste with a wiper or trowel.

Furthermore, good penetration of the applied layer by the paste as well as a quick swelling of the substrate is important for the processing of the wallpaper. Widths of wallpaper can be hung smoothly only when originally present bubbles are eliminated by shrinking upon drying. Penetration by the paste and swelling of the paper should proceed quickly so that the applied paste does not dry out from the edges and undesirable gaping at the joining seams of the glued widths as well as bucking of edges do not occur. Penetration can be determined analytically by the absorption of water according to Cobb (DIN 53 132). Swelling time is determined empirically, by gluing tests. The desirable values for given dispersions can be reached by the addition of respective amounts of zeolite.

In a preferred embodiment of the invention, a pretreatment composition to be applied to the surface of paper to be glued to a surface comprises a mixture of
(a) from about 20 to 50 parts by weight of a dispersion containing from 30 to 60% by weight of the dispersion of film-forming, non-blocking thermoplastic polymer;
(b) from about 10 to 30 parts by weight of a paraffin dispersion comprised of from about 30 to 60% by weight of paraffin and having a melting point of from about 35° to 50° C.;
(c) from about 2 to 20 parts by weight of the total solids content of the composition of natural and synthetic zeolite having a particle size of from about 3 to 10$\mu$;
(d) optionally, from about 0 to 25 parts by weight of the total solids content of the composition of additional conventional additives; and
(e) from about 20 to 40 parts by weight of water
and has a solids content of from 30 to 60% and a viscosity of from about 200 to 1,500 mPa's.

The examples below are intended to illustrate the invention and are not to be construed as limiting the invention thereof.

EXAMPLES

Example 1

A pretreatment material of the following components was prepared by mixing with slow agitation:
35 parts by weight of a 45% by weight dispersion of a copolymer of styrene and butyl acrylate (commercial product with a viscosity of 180 mPa's according to Epprecht, particle size of approximately 0.2$\mu$, film-forming temperature of 45° C.);
17 parts by weight of a 50% by weight paraffin dispersion (Ravitol from Henkel KGaA, melting point: 42° C.);
2 parts by weight of silicic acid (colloidally dispersible);
26 parts by weight of demineralized water; and
4 parts by weight of zeolite (commercial sodium aluminosilicate with a particle size of from about 3 to 5$\mu$).

This composition had a viscosity of 240 mPa's. Paper with a weight of 80 g/m$^2$ was coated with the composition so that an application 8 g of dry substance per m$^2$ was obtained. The side of the paper treated in this manner had a Cobb$_{180}$-value of 14 g/m$^2$.

The paper prepared in this manner was coated with a 2% solution methyl cellulose (900 mPa's according to Brookfield, at 20° C., 20 rpm). Complete wetting took place, the application being 3.5 g of methyl cellulose per m$^2$. After a swelling time of 4 minutes, gluing to plasterboard could be carried out by the usual method. Uniform papering was achieved after application of the wallpaper to the plasterboard and drying. The wallpaper could be peeled off dry from the board. The mean peeling force was 210 g/m$^2$, determined from 5 tests.

Example 2

A laminating dispersion was prepared by slowly stirring together:

- 35 parts by weight of 45% by weight dispersion of copolymer of styrene and butyl acrylate (particle size of from about 0.2 to 0.3μ, film-forming temperature of 42° C., viscosity according to Epprecht of 250 mPa's);
- 17 parts by weight of a 50% by weight paraffin dispersion (melting point 44°–45° C.; Ravitol from Henkel KGaA);
- 2 parts by weight of silicic acid (collodially dispersible);
- 26 parts by weight of demineralized water;
- 4 parts by weight of zeolite (sodium aluminosilicate of an average granule size of approximately 10μ); and
- 0.08 parts by weight of partially saponified graft polymer of acrylonitrile on starch (1.5 parts by weight of acrylonitrile were grafted on 1 part by weight of starch; the saponification had resulted in amide and carboxyl groups in a 1:3 ratio).

The dispersion had a viscosity of 800 mPa's.

Wallpaper of 80 g/m$^2$ was coated with this emulsion according to the procedure set forth in Example 1, resulting in an application of 8 g/m$^2$. The Cobb$_{180}$-value after drying was 15.1 g/m$^2$.

The back of the wallpaper prepared in this manner was coated with a layer of a 2% aqueous solution of a wallpaper paste (base: methyl cellulose, 9000 mPa's according to Brookfield at 20° C., 20 rpm). Complete wetting took place. A layer of 3.5 g/m$^2$ was determined after drying.

After a swelling time of 3 minutes, complete wetting had occurred, and gluing to a plasterboard was carried out. After drying of the wallpaper to the plasterboard, the wallpaper could be peeled off dry. The mean peeling force was 220 g/m$^2$, determined from 5 tests.

Comparison Test

A composition corresponding to that of Example 1 was prepared, with the exception that no zeolite was added. The viscosity of this mixture was 200 mPa's.

Following the procedure of Example 1, wallpaper of 80 g/m$^2$ was coated with 8 g/m$^2$ (dry weight) of the composition. The Cobb$_{180}$-value was then 6.1 g/m$^2$.

The back of the wallpaper was then wetted with a 2% aqueous solution of methyl cellulose. The application was 3.5 g/m$^2$ of dry substance; however, visual observation showed that the surface was not completely wetted. After a swelling time of 16 minutes, the wallpaper prepared in this fashion was glued to plasterboard.

Adhesion of the wallpaper to the plasterboard substrate was uneven. The mean peeling force was 181 g/m$^2$, determined from 5 tests. After 1 to 2 hours, the wallpaper became detached at some edges from the plasterboard.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A composition for pretreating the back of paper to be glued to a surface, which comprises a mixture of:
   (a) a fine-grained dispersion of film-forming, non-blocking thermoplastic polymer;
   (b) a paraffin dispersion;
   (c) natural or synthetic zeolite;
   (d) optionally, additional conventional additives; and
   (e) water.

2. The composition of claim 1 wherein the zeolite (c) is present in an amount of from 1 to 25 parts by weight, based on the total solids content of the composition.

3. The composition of claim 1 which additionally contains from about 0.05 to 0.5 parts by weight of a partially saponified graft polymer of acrylonitrile on starch.

4. The composition of claim 1 wherein the thermoplastic polymer is a copolymer of styrene and butyl acrylate.

5. In a wallpaper to be applied to a surface, the improvement which comprises having the backside of the wallpaper treated with a pretreatment composition of claim 1.

6. The composition of claim 1 which comprises a mixture of:
   (a) from about 20 to 50 parts by weight of a dispersion containing from 30 to 60% by weight of the dispersion of a film-forming, non-blocking thermoplastic polymer;
   (b) from about 10 to 30 parts by weight of a paraffin dispersion comprised of from about 30 to 60% by weight of paraffin and having a melting point of from about 35° to 50° C.;
   (c) from about 2 to 20 parts by weight of the total solids content of the composition of natural or synthetic zeolite having a particle size of from about 3 to 10μ;
   (d) optionally, from about 0 to 25 parts by weight of the total solids content of the composition of additional conventional additives; and
   (e) from about 20 to 40 parts by weight of water and has a solids content of from 30 to 60% and a viscosity of from about 200 to 1,500 mPa's.

7. The composition of claim 6 which additionally contains from about 0.05 to 0.5 parts by weight of a partially saponified graft polymer of acrylonitrile on starch.

8. The composition of claim 6 wherein the thermoplastic polymer is a copolymer of styrene and butyl acrylate.

9. The composition of claims 6 or 7 which contains from about 0.5 to 5% by weight, based on the total solids content of the composition, of said component (d).

10. The composition of claim 9 wherein component (d) is a member selected from the group consisting of surface-active compounds, thixotropic substances, and mixtures thereof.

* * * * *